US 7,037,003 B2

(12) United States Patent
Christensen et al.

(10) Patent No.: US 7,037,003 B2
(45) Date of Patent: May 2, 2006

(54) SYSTEMS AND METHODS FOR REDUCING SPLICE LOSS IN OPTICAL FIBERS

(75) Inventors: Erling D. Christensen, Frederiksberg (DK); Torben E. Veng, Roskilde (DK); Andrew D. Yablon, Livingston, NJ (US)

(73) Assignee: Fitel USA Corp., Norcross, GA (US)

( * ) Notice: Subject to any disclaimer, the term of this patent is extended or adjusted under 35 U.S.C. 154(b) by 62 days.

(21) Appl. No.: 10/293,824

(22) Filed: Nov. 12, 2002

(65) Prior Publication Data
US 2004/0091219 A1 May 13, 2004

(51) Int. Cl.
G02B 6/255 (2006.01)

(52) U.S. Cl. .............................. 385/96; 385/95

(58) Field of Classification Search .............. 385/95–99
See application file for complete search history.

(56) References Cited

U.S. PATENT DOCUMENTS

| | | | | |
|---|---|---|---|---|
| 4,900,114 A | | 2/1990 | Mortimore et al. | ........... 385/96 |
| 2003/0012526 A1 | * | 1/2003 | Riis et al. | ...................... 385/96 |

OTHER PUBLICATIONS

Krause, J. et al., "Splice Loss of Single–Mode Fiber as Related to Fusion Time, Temperature, and Index Profile Alteration," Journal of Lightwave Technology, Jul. 1986, vol. LT–4, No. 7.

Tam, H.Y., "Simple Fusion Splicing Technique for Reducing Splicing Loss Between Standard Singlemode Fibres and Erbium–Doped Fibre," Electronics Letters, Aug. 15, 1991, pp. 1597–1599, vol. 27, No. 17.

Ando, Y. et al., "Low–Loss Optical Connector Between Dissimilar Single–Mode Fibers Using Local Core Expansion Technique by Thermal Diffusion," IEEE Photonics Technology Letters, Sep. 1992, vol. 4, No.9.

O'Brien, E.M. et al., "Low–Loss Fattened Fusion Splices Between Different Fibres," Electronics Letters, Jan. 21, 1999, pp. 168–169, vol. 35, No.2.

* cited by examiner

*Primary Examiner*—Phan T. H. Palmer
(74) *Attorney, Agent, or Firm*—Daniel Kim, Esq.

(57) ABSTRACT

Techniques are described for reducing splice loss between a pair of optical fibers. A first fiber is spliced to a second fiber at a splice point. A region of the spliced fibers, including the splice point, is thermally treated to cause a controlled diffusion of dopants in the region. A controlled tension is then applied to the splice region while heating it to a predetermined temperature to produce a controlled change in the splice region's strain state. Further described is a heat and tension station for performing a heat and tension technique on a pair of spliced fibers.

22 Claims, 13 Drawing Sheets

SYSTEMS AND METHODS FOR REDUCING SPLICE LOSS IN OPTICAL FIBERS

BACKGROUND OF THE INVENTION

1. Field of the Invention

The present invention relates generally to improvements in the field of fiber optics, and particularly to advantageous aspects of systems and methods for reducing splice loss in optical fibers.

2. Description of Prior Art

Splice loss is a significant issue in the design and implementation of optical fiber systems. For example, when a standard single-mode fiber (SMF) is spliced to a dispersion compensating fiber (DCF), also known as an inverse dispersion fiber (IDF), it is not uncommon for splice losses greater than 0.1 dB to result, as well as wavelength-dependent splice loss of greater than 0.1 dB per 100 nm. These splice losses typically limit the performance of dispersion-managed fiber spans and dispersion compensating modules (DCMs).

Thus, there is an ongoing effort to develop techniques and systems for reducing splice loss. Certain types of post-splice heat treatments have been described for reducing splice loss, predicated on diffusion of the dopants in the fiber. See, for example, Krause, John T. et al., "Splice Loss of Single-Mode Fiber as Related to Fusion Time, Temperature, and Index Profile Alteration," Journal of Lightwave Technology, Vol. LT-4, No. 7, 1986, pp. 837–40; Tam, H. Y., "Simple Fusion Splicing Technique for Reducing Splicing Loss between Standard Singlemode Fibres and Erbium-Doped Fibre," Electronics Letters, Vol. 27, No. 17, 1991, pp. 1597–99; and Ando, Yasuhiro, "Low-Loss Optical Connector between Dissimilar Single-Mode Fibers Using Local Core Expansion Technique by Thermal Diffusion," IEEE Photonics Technology Letters, Vol. 4, No. 8, 1992, pp. 1028–31.

Another described process relies upon stretching an optical fiber in the vicinity of a splice. Mortimore, David B. et al., "Technique for Reducing Fibre Joint Loss," U.S. Pat. No. 4,900,114, Feb. 13, 1990. A variation of this technique relies upon compressing an optical fiber in the vicinity of a splice. O'Brien, E. M. et al., "Low-Loss Fattened Fusion Splices between Different Fibers," Electronics Letters, Vol. 35, No. 2, pp. 168–69, 1999.

SUMMARY OF INVENTION

These and other issues are addressed by the present invention, aspects of which provide systems and methods for reducing optical fiber splice loss. In a method according to an aspect of the invention, a first fiber is spliced to a second fiber at a splice point. A region of the spliced fibers, including the splice point, is thermally treated to cause a controlled diffusion of dopants in the region. A controlled tension is then applied to the splice region while heating it to a predetermined temperature to produce a controlled change in the splice region's strain state. A further aspect of the invention provides a heat and tension station for performing a heat and tension technique on a pair of spliced fibers.

Additional features and advantages of the present invention will become apparent by reference to the following detailed description and accompanying drawings.

DETAILED DESCRIPTION

Aspects of the invention provide methods and systems for reducing splice loss and wavelength dependence of splice loss in optical transmission systems. The invention may suitably be used, for example, in an optical transmission system in which a dispersion compensating fiber (DCF) is spliced to another type of fiber. Reducing splice loss and wavelength dependence can significantly improve the performance of devices and spans assembled from DCF. As used herein, the term "dispersion compensating fiber" refers generally to fibers having a negative dispersion slope, including standard DCF, inverse dispersion fiber (IDF), extremely high dispersion slope fiber (EHS), and wideband DCF. It should be noted that the present invention is not limited to DCF, but may be used to reduce splice loss in optical transmission lines comprising other types of fibers.

Figure 1:
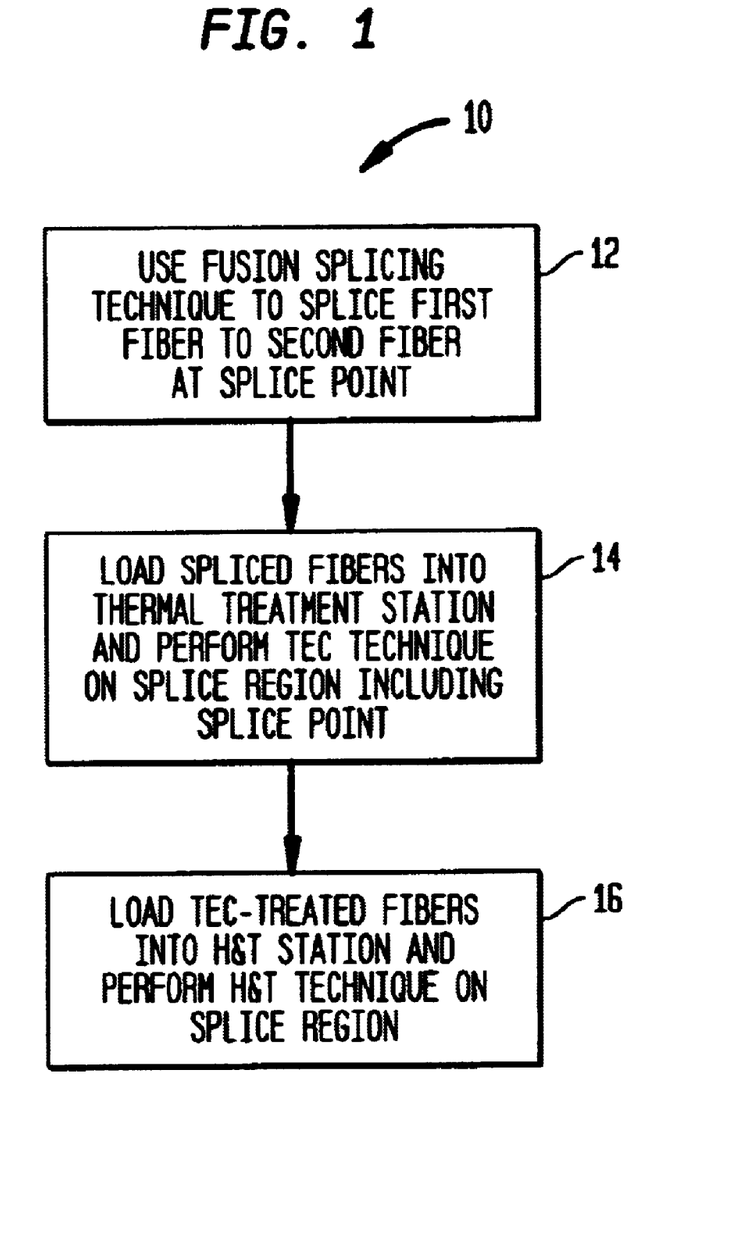
FIG. 1 shows a flowchart of a method for reducing splice loss according to an aspect of the invention.

FIG. 1 shows a flowchart of a method 10 according to an aspect of the invention. In step 12, a fusion splicing technique is used to splice a first fiber to a second fiber at a splice point. In step 14, a region of the spliced fibers including the splice point is treated using a thermally expanded core (TEC). In step 16, the TEC-treated fibers are then treated using an H&T technique. The TEC and H&T techniques are described in detail below. Further described below is an H&T station, according to a further aspect of the invention, that is suitable for use in conjunction with the method 10 shown in FIG. 1. As described below, the combined use of the TEC and H&T techniques results in a reduction in splice loss that is greater than the splice loss reduction that is obtainable using either the TEC or H&T technique alone.

In a TEC technique, a first fiber is fusion spliced to a second fiber. The spliced fibers are then loaded into a thermal treatment station, where a torch or other suitable heating source is used to heat the splice region according to a heating profile to cause a smooth, controlled diffusion of fiber dopants in the splice region. This controlled diffusion of dopants results in a significant reduction in splice loss. An example of a TEC technique that is suitable for use in conjunction with the present invention is described in U.S. patent application Ser. No. 10/197,184, filed on Jul. 17, 2002, which has been assigned to the assignee of the present application, and which is incorporated herein by reference in its entirety.

Figure 2:
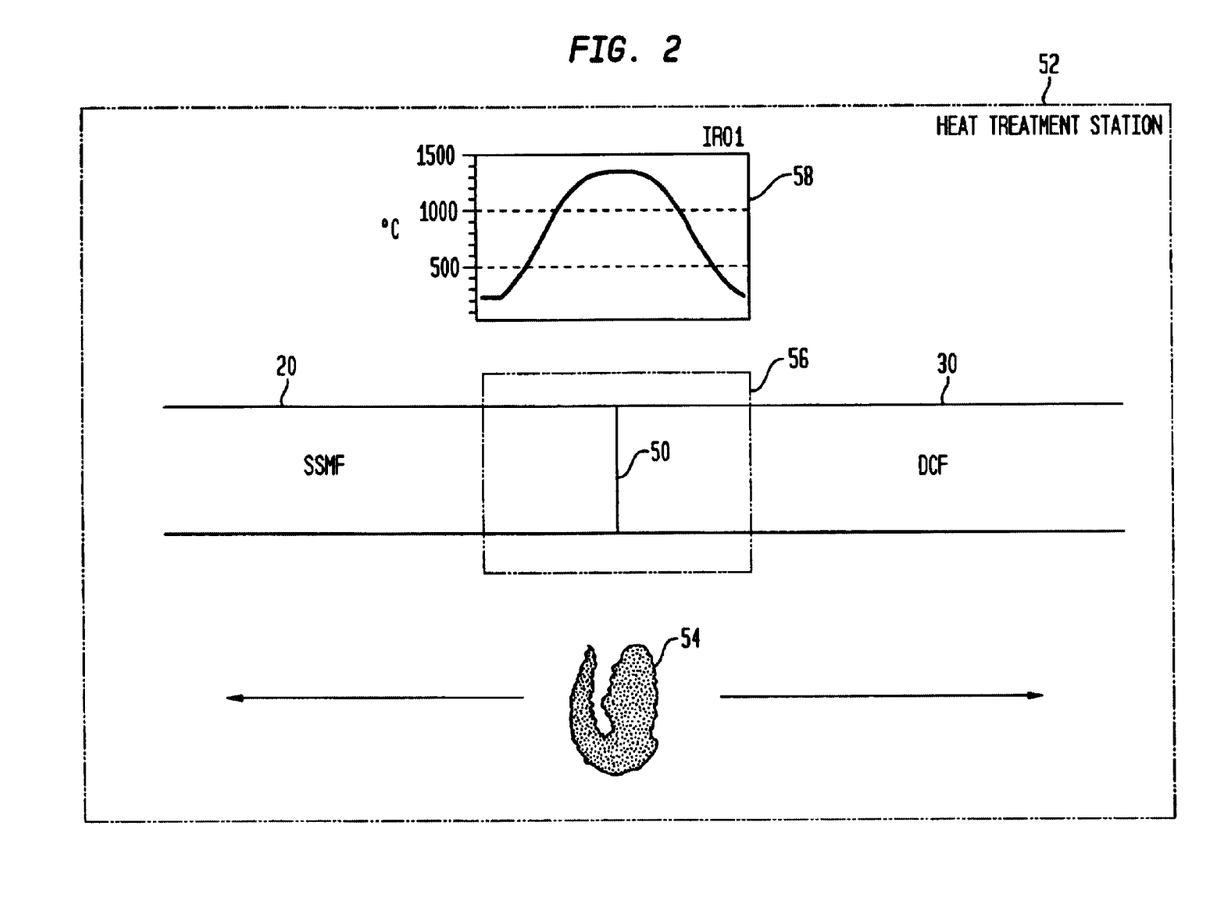
FIG. 2 shows a diagram of a heat and tension station suitable for use in conjunction with the method shown in FIG. 1.

The TEC technique described in U.S. patent application Ser. No. 10/197,184 is illustrated in FIGS. 2–7. In FIG. 2, a first fiber 20 has been fusion spliced to a second fiber 30 at a splice point 50. In this example, the first fiber 20 is a standard single mode fiber (SSMF), and the second fiber 30 is a dispersion compensating fiber (DCF). After splicing, the spliced fibers 20 and 30 have been loaded into a heat treatment station 52, in which a heat source 54, such as a gas torch flame, is used to apply heat to a splice zone 56. In this example, the gas torch flame 54 is scannable in both directions along the length of the SSMF 20 and DCF 30. In addition, the intensity of the gas torch flame 54 and the size of the splice zone 56 are controllable by regulating the gas flow to the torch 54.

The splice zone 56 is heated in accordance with a heating profile 58, which causes a tapered diffusion of the dopants in the SSMF 20 and DCF 30 in the splice zone 56. The x-axis of the heating profile represents distance along the length of the spliced fiber 20 and 30, and the y-axis represents heating temperature. The splice point 50 is located at the center of the heating profile 58, which is approximately 4 mm wide. As shown in the heating profile 58, the splice point 50 is heated to approximately 1,300° C. The amount of heat applied to the spliced fibers drops off approximately sinusoidally on either side of the splice point 50.

Figure 3:
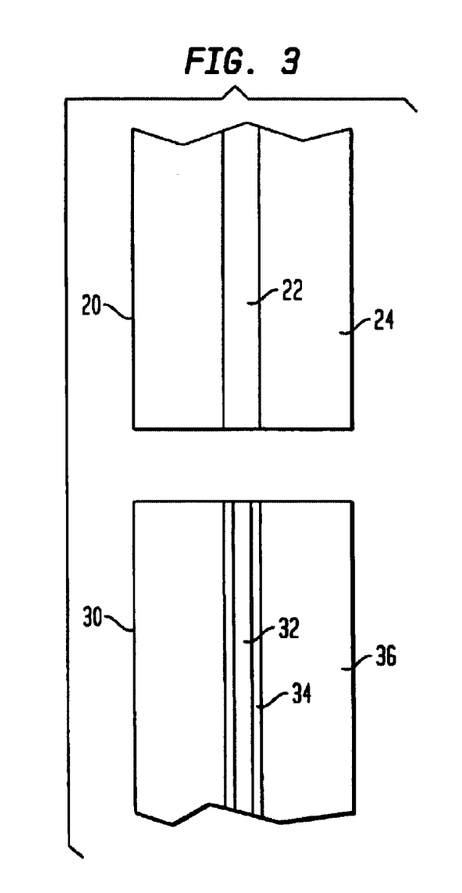
FIG. 3 shows a plan view and FIG. 4 shows a side view of a heating block suitable for use in the heat and tension station shown in FIG. 2.
Figure 4:
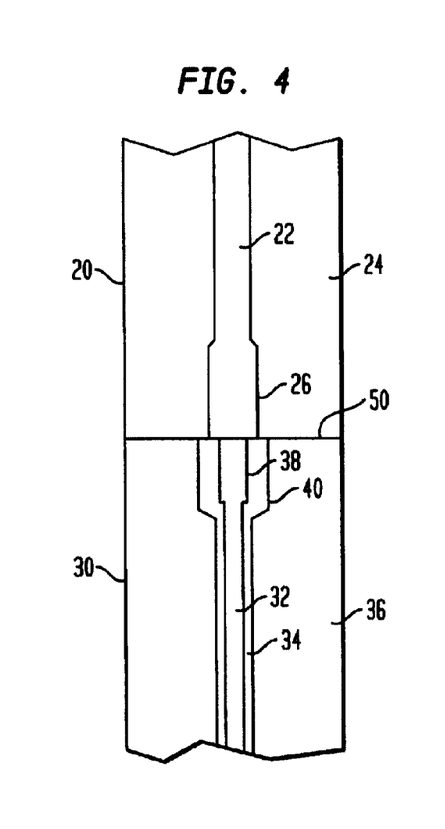
Figure 5:
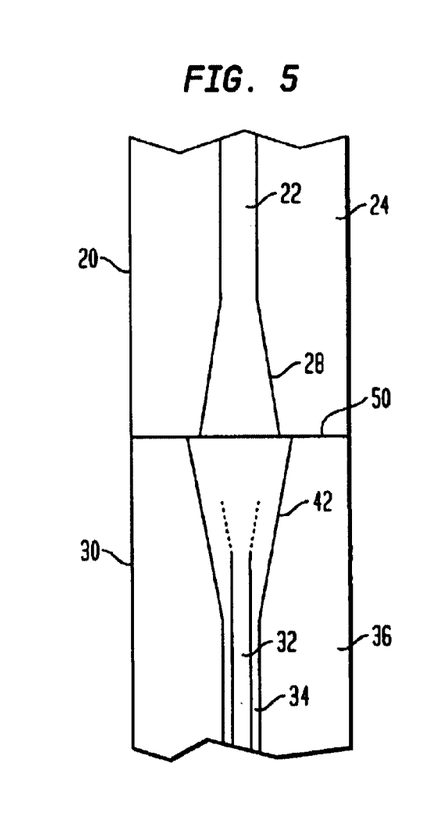
FIG. 5 shows a diagram of a tensioning system suitable for use in the heat and tension station shown in FIG. 2.

FIGS. 3, 4 and 5 are a series of longitudinal cross section diagrams illustrating the effect of the heat treatment on the dopants in the SSMF 20 and DCF 30. FIG. 3 shows the fibers 20 and 30 prior to splicing. The SSMF 20 includes a germanium-doped core 22 and an undoped cladding 24. The DCF 30 includes a germanium-doped core 32, a first cladding layer 34, which is heavily doped with fluorine, and an undoped overclad 36.

In FIG. 4, a fusion splicer has been used to splice together the SSMF 20 and the DCF 30 at the splice point 50. The heat of the fusion splicing process has caused some diffusion in the SSMF and DCF dopants. As shown in FIG. 4, the SSMF core 22 includes a slightly expanded portion 26. Similarly, the DCF core 32 and first cladding region 34 also have slightly expanded portions 38 and 40.

As described above, the spliced fibers are then loaded into a heat treatment station. FIG. 5 shows the results of the heat treatment process. It will be seen that the expanded portion of the SSMF core 26 has been shaped into a smooth, tapered pathway 28. The expanded portions of the DCF core 38 and cladding 40 have blended together, and also form a smooth, tapered pathway 42.

Figure 6:
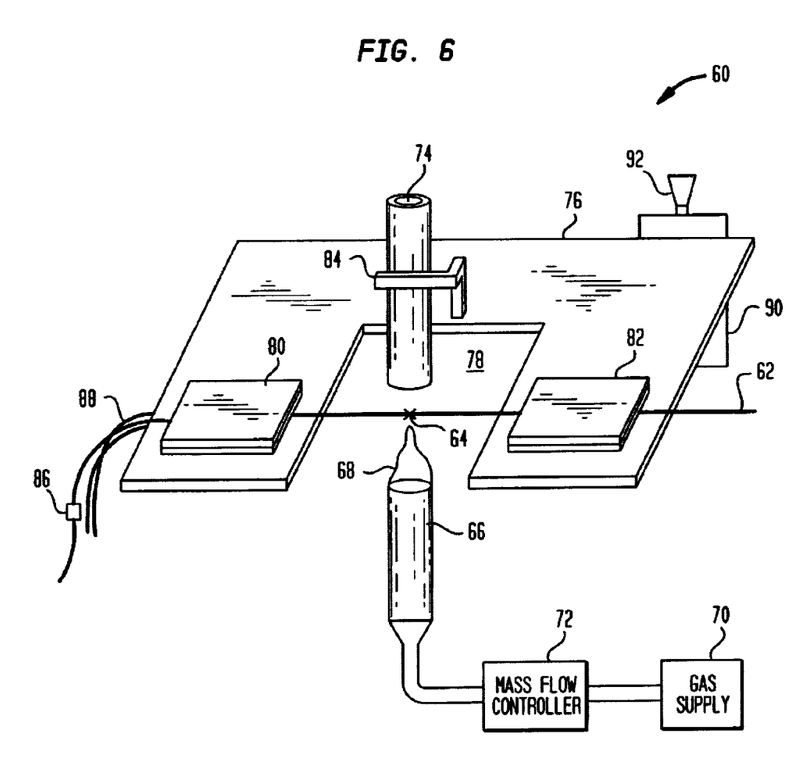
FIG. 6 shows a graph illustrating a heat and tension profile suitable for use in conjunction with the method shown in FIG. 1 and the heat and tension station shown in FIG. 2.

FIG. 6 shows a perspective view of an example of a heat treatment station 60 that is suitable for use in practicing the techniques described herein. The heat treatment station 60 shown in FIG. 6 is further described in U.S. patent application Ser. No. 10/197,184. It will be appreciated, however, that the techniques described herein may also be practiced with other heat treatment stations without departing from the spirit of the invention.

The thermal treatment station 60 shown in FIG. 6 is used to apply heat to a spliced optical fiber line 62. The splice point 64 of the optical fiber 62 is positioned over a heating device 66, which in the present example is implemented using a gas torch with a flame 68 that is fed by a gas supply 70. Other heating elements may suitably be used without departing from the spirit of the invention. In order to precisely regulate the torch flame 68, the gas supply 70 is provided with a mass flow controller 72. A chimney 74 is positioned over the torch 66 to stabilize the flame 68 during heating. The fiber 62 and chimney 74 are held in position by a plate 76 that includes a cutaway portion 78 for exposing the splice point 64. The fiber 62 is held in position on the plate 76 by first and second clamps 80 and 82 located on either side of the cutaway portion 78, and the chimney 74 is held in position on the plate 76 by an arm 84 that grips the chimney 74.

A slight tension is maintained in the fiber 62 during the heating process by a weight 86 that is removably attached to one end of the fiber 62. This tension prevents the fiber 62 from moving relative to the flame 68 during the heating process. Care must be taken to decide the right weight to avoid stretching of the fiber when it is heated. In the present example, a weight of 0.7 g is used. The first clamp 80 holds the fiber 62 sufficiently loosely to allow the tension in the fiber 62 to be controlled in this manner and functions as a fiber guide. To prevent bending damage to the fiber 62, a curved guide 88 is provided, upon which the weighted portion of the fiber 62 rests during the heating process.

The plate 76 is movable relative to the torch 68 using a translation stage 90 upon which the plate 76 is mounted. A position reading device 92 provides precise information as to location of the plate 76. When the spliced fiber 62 is initially mounted into the thermal treatment station 60, the plate 76 is positioned far above the flame 68. After mounting, the splice point 64 is moved into the flame using the translation stage 90. For repeatable results, the position of the translation stage 90 is monitored using the position reading device 92. Once an optimal position for the splice point 64 with respect to the flame 68 is determined, this position is used for subsequent thermal treatments.

The torch 66 is fabricated from a quartz tube having an inner diameter of approximately 4 mm. Since the temperature necessary to diffuse the fluorine is estimated to be approximately 1,200-1,300° C., a gas such as propane or hydrogen without an additional oxygen supply can be used. The mass flow controller 72 is used to keep the gas flow at the right value. Typical flows are about 10 ml/min for propane. Again, this value must be optimized for the particular fibers used.

The splice loss is monitored while the splice 64 is in the flame 68. When the minimum splice loss is reached, in approximately 10 minutes, the translator 90 is used to remove the splice 64 from the flame 68. The splice 64 can now be removed from the thermal treatment station 60. The thermal treatment station 60 shown in FIG. 6 requires only 1 cm of bare fiber 62 at the splice point 64. Thus, the thermal treatment station 60 provides for compact splice protection.

Figure 7:
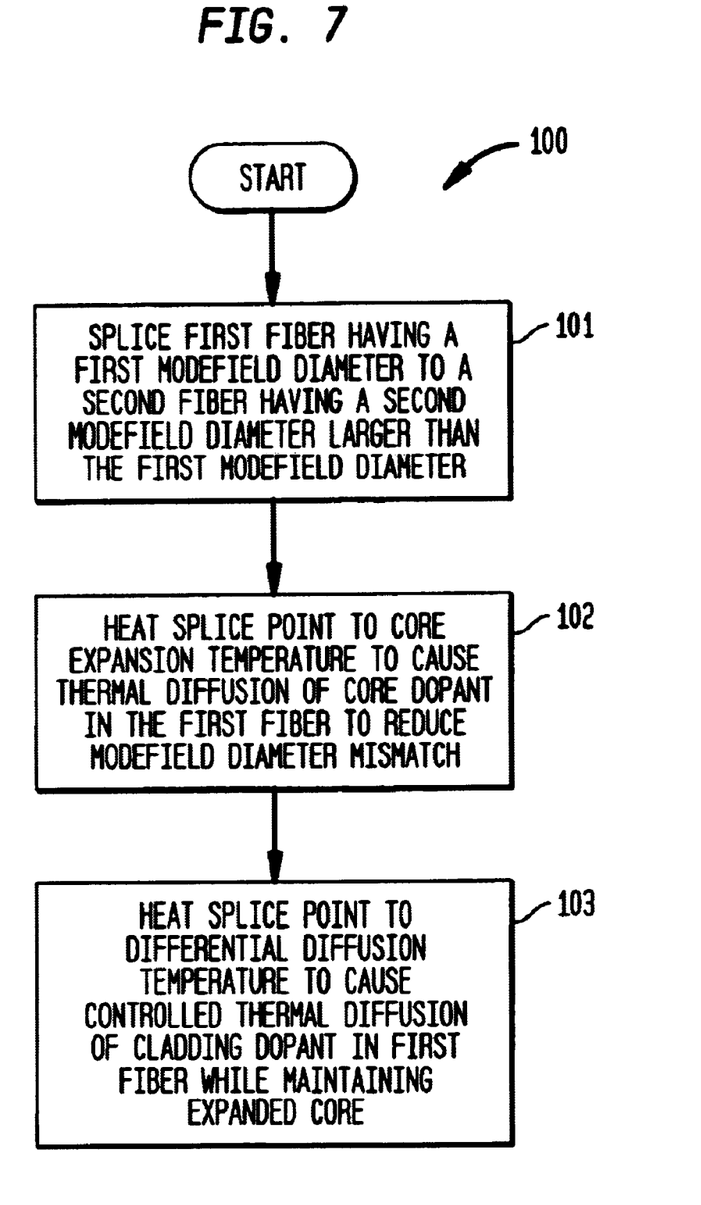
FIG. 7 shows a flowchart illustrating a control process suitable for implementing the heat and tension profile shown in FIG. 6.

FIG. 7 shows a flowchart of a differential diffusion method 100 suitable for use in accordance with the present invention. In step 101, a first fiber having a first modefield diameter is spliced to a second fiber having a second modefield diameter that is greater than the first modefield diameter. In step 102, the splice point is heated to a core expansion temperature to cause a controlled thermal diffusion of a core dopant in the first fiber, thereby causing an expansion of the modefield of the first fiber to reduce the modefield mismatch. In step 103, the spliced fiber is heated to a differential diffusion temperature to cause a controlled diffusion of a cladding dopant in the first fiber, while preserving the expanded core of the first fiber. As described above, steps 101 and 102 may be performed using a fusion splicer, and step 103 may be performed using a thermal treatment station, such as the thermal treatment station shown in FIG. 6.

As discussed above, according to an aspect of the present invention, after a TEC technique has been performed on a pair of spliced fibers, the fibers are then treated using a heat and tension (H&T) technique, in which controlled heat and tension are applied to the splice region. An H&T technique that is suitable for use in conjunction with the present invention is described in U.S. patent application Ser. No. 10/190,137, filed on Jul. 3, 2002, which has been assigned to the assignee of the present application, which is incorporated by reference in its entirety.

As described in U.S. patent application Ser. No. 10/190, 137, the H&T process is performed on a pair of fibers that have been fusion spliced together at a splice point. A controlled tension is applied to a region of the spliced fibers including the splice point. While the fibers are under tension, a heat source is scanned along the splice region. Alternatively, a wider, stationary heat source may be employed. The tension and the heat may be modulated during the process. After the heat source is removed and the fibers have cooled, the applied tension is released. The fiber temperature is kept low enough to suppress plastic deformation during the H&T process. With the proper tension and heating conditions, the splice loss and the wavelength dependent splice loss may be substantially reduced or even eliminated.

A specific example of the H&T process is now described. Two inverse dispersion fibers (IDF) fiber tips are stripped, cleaned, and cleaved according to standard fusion splicing procedure. The fibers are spliced on a Vytran FFS-2000 Filament Fusion Splicer with the following splice parameters:

splice power 17 W
hot push distance 13 microns
hot push delay 350 ms
hot push velocity 700 steps/second
splice time 2.5 seconds
prepush 5 microns
argon flow 0.65 liters/minute
pregap 8 microns
no fire polish The fiber holding block cleave tension is set to approximately 200 grams. Once the splice is completed, the fiber clamps are released and the fiber holding blocks are manually compressed together, without moving the fibers, and the fiber clamps are closed onto the fiber once again. These steps cause approximately 200 grams of tension to be applied to the fibers. The filament is now scanned across the entire heat-affected splice zone at a speed of about 320 microns/second at a power of about 12 W with an argon flow of about 0.65 liters/minute. It has been found that this combination of heat and tension produces a significant reduction in splice loss.

Figure 8:
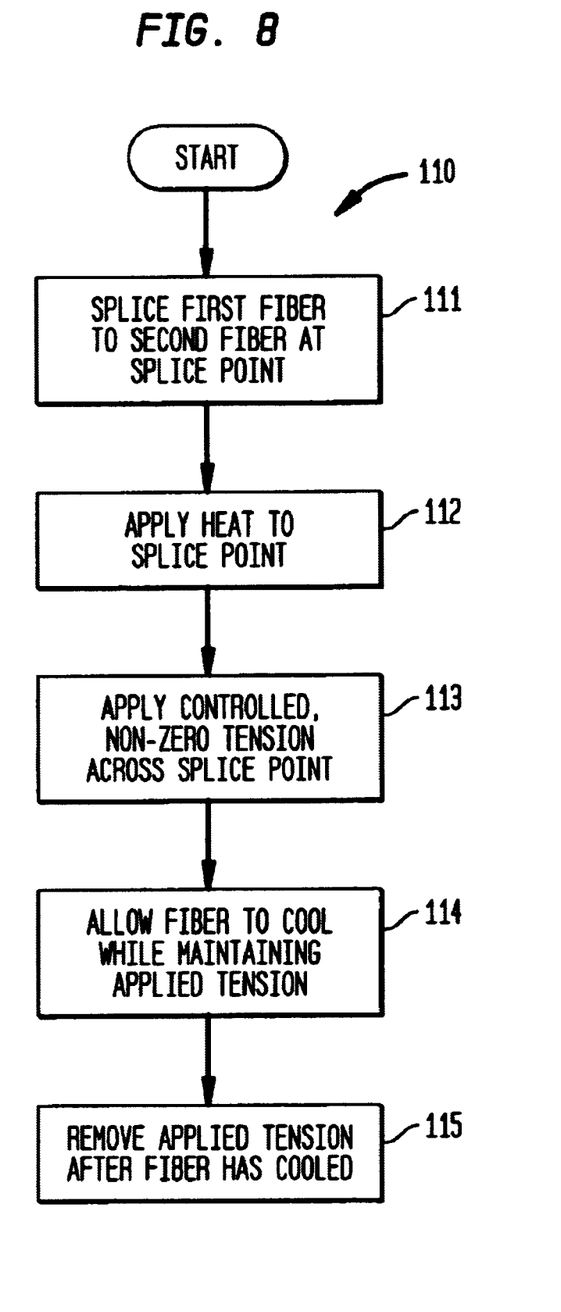
FIG. 8 shows a graph comparing splice loss as a function of wavelength dependence for an exemplary pair of spliced fibers after a thermally expanded core (TEC) technique has been performed on the fibers, and after a combined TEC and heat and tension (H&T) technique has been performed on the fibers.

FIG. 8 shows a flowchart of an H&T process 110 suitable for use in accordance with the present invention. In step 111, a first fiber and a second fiber are fusion spliced together at a splice point. In step 112, once the fibers have been spliced together, the region of the transmission line proximate to the splice point is heated to a temperature that is sufficiently high to reduce transmission loss, but low enough so that there is minimal plastic deformation of the fiber. In step 113, tension is then applied to the splice, producing a further decrease in transmission loss. If desired, the amount of applied heat and/or the amount of applied tension may be adjusted to adjust the amount of splice loss. In step 114, the heat source is removed from the splice point, and the spliced fiber is allowed to cool while the tension is maintained. Finally, in step 115, the applied tension is removed from the fiber.

Figure 9:
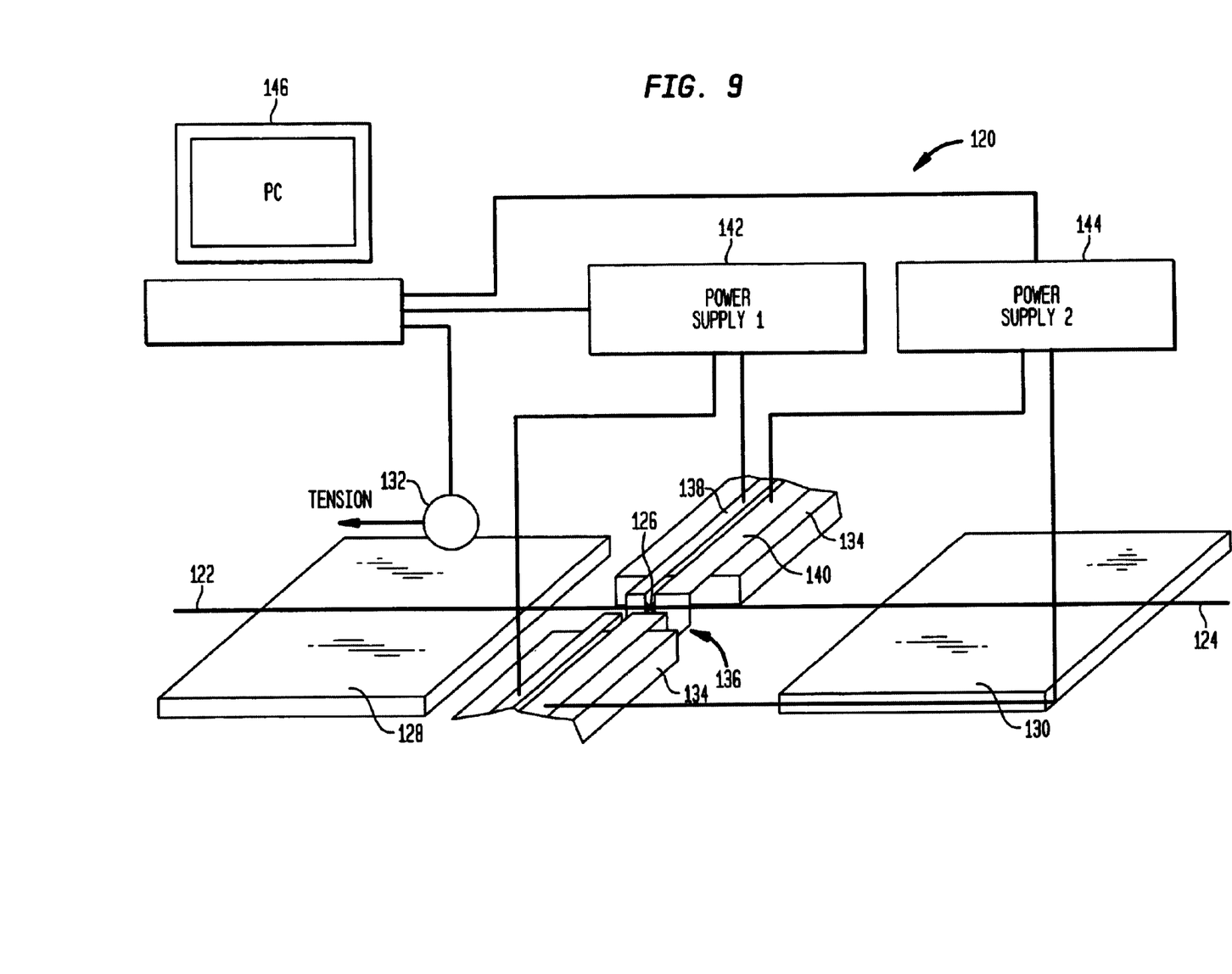
FIG. 9 shows another graph comparing splice loss as a function of wavelength dependence for a second exemplary pair of spliced fibers after a TEC technique has been performed on the fibers, and after a combined TEC and H&T technique has been performed on the fibers.

FIG. 9 shows a diagram of an H&T station 120 according to a further aspect of the invention that is suitable for performing an H&T technique on a pair of spliced fibers 122 and 124, which have been fusion spliced together at a splice point 126, marked with an "X." In the present example, the fibers 122 and 124 have already been treated with a TEC technique. However, it would also be possible to use the H&T station 120 to perform an H&T technique on a pair of spliced fibers without first performing a TEC technique on the fibers. In FIG. 9, the first fiber 122 has been removably mounted to a first fiber mounting plate 128, and the second fiber 124 has been removably mounted to a second fiber mounting plate 130.

Plate 128 is translatable in the direction of the longitudinal axis of the fibers 122 and 124. A tensioning device 132 is provided for urging first plate 128 away from the second plate 130, thereby applying tension to the fibers 122 and 124 between the first and second fiber mounting plates 128 and 130. As shown in FIG. 9, tension is also applied to the splice point 126. As described below, the tensioning device 132 may be implemented using a piston or other suitable device.

Situated between the first and second plates 128 and 130 is a heating block 134 that includes a U-shaped channel 136. The first plate 128, second plate 130 and channel 136 are aligned with respect to each other such that the splice fibers 122 and 124 extend in a substantially straight line across first mounting plate 128, through the U-shaped channel 136, and across the second mounting plate 130. The U-shaped channel 136 is heated by parallel first and second resistive heating elements 138 and 140 that are mounted onto the inner surface of the channel 136. The first heating element 138 is powered by a first power supply 142, and the second heating element 140 is powered by a second power supply 144.

The tensioning device 132, first power supply 142 and second power supply 144 are all controlled independently by a controller 146, such as a personal computer or other suitable controller device. As described below, controller 146 is programmed with suitable process-control software to create and maintain a desired heat and tension profile.

Figure 10:
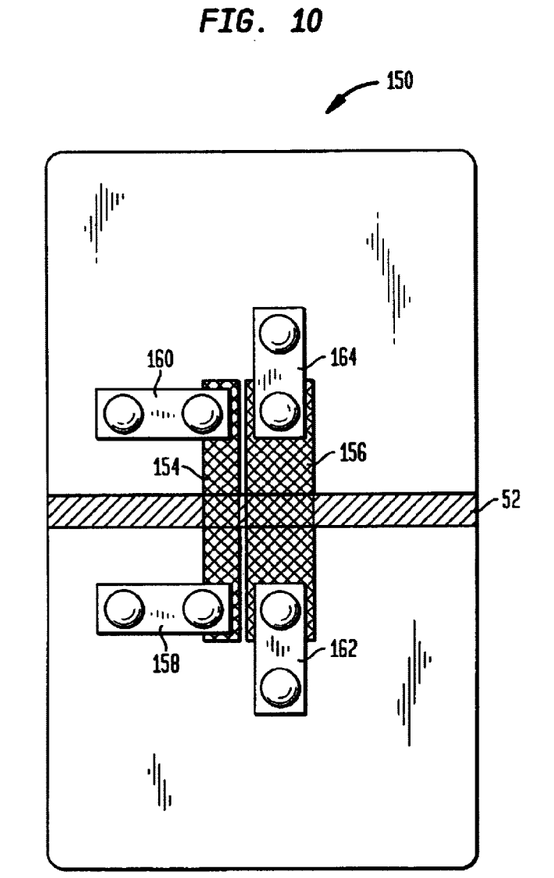
FIG. 10 shows results obtained applying a combined TEC and H&T technique on a splice between a wideband dispersion compensating fiber (DCF) (−200 ps/nm-km) and a standard SMF.
Figure 11:
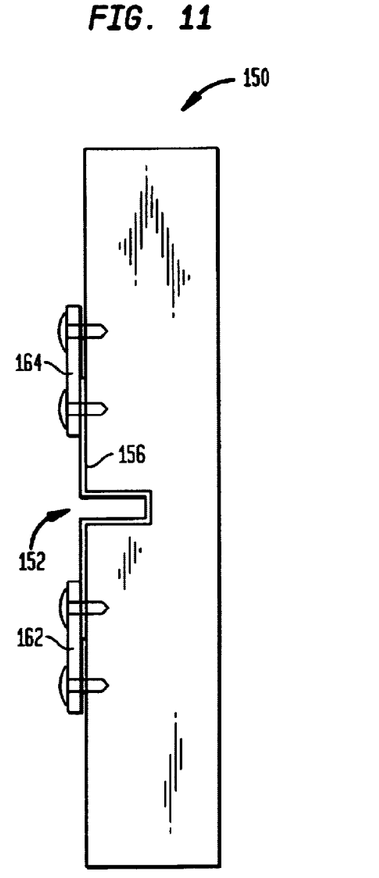
FIG. 11 shows a graph comparing splice loss reduction for an extremely high dispersion slope (EHS) fiber (−210 ps/nm-km) spliced to a standard SMF when applying an H&T technique alone, a TEC technique alone, and a combination of the two techniques.

FIG. 10 shows a plan view, and FIG. 11 shows a side view of a heating block 150 suitable for use in the H&T station 120 shown in FIG. 9. The heating block 150 may be fabricated from a heat-resistant ceramic or other suitable material. The block 150 includes a U-shaped channel 152 extending across its upper surface. The channel 152 is shaped and dimensioned so that a spliced pair of optical fibers may be suspended within the channel 152 without the fibers touching any of the channel walls. In a presently preferred block 150, the channel has a depth of approximately 3 mm and a width of approximately 1 mm.

The heating block 150 further includes a heating assembly that, according to the present aspect of the invention, comprises a pair of resistive heating elements 154 and 156. Each heating element 154 and 156 is a strip, ribbon, or filament, that is affixed to the interior walls of the channel 152 and along the upper surface of the block 150. The strips 154 and 156 are substantially parallel, and are arranged side-by-side on the block 150 to provide a combined heat zone when current flows through both strips 154 and 156. In the view shown in FIG. 10, the combined heat zone extends from the left edge of the first heating strip 154 to the right edge of the second heating strip 156.

The reason for using two separate heating elements is to control the temperature field. By tuning the mutual temperatures in the two heaters, the temperature profile can be fine-tuned to avoid mode coupling when applying an H&T technique to a pair of spliced fibers, in which one of the spliced fibers is a DCF. The issue of mode coupling may be significant, for example, when splicing a DCF with a relatively strong waveguide dispersion or when inducing especially large changes using the H&T technique. The DCF is placed on the same side as the narrower heating element 154, which is heated to a lower temperature than the wider heating element 156. Thus, the DCF is placed at the side with the lower temperature gradient.

There are further provided a first pair of electrical connectors 158 and 160 for connecting the first heating filament 154 to a first power supply, and a second pair of electrical connectors 162 and 164 for connecting the second heating element 156 to a second power supply. As mentioned above, in the H&T system 120 shown in FIG. 9, the first and second power supplies may suitably be operated by a PC or other controller unit 146.

A suitable material for heating elements 154 and 156 is Kanthal D, an alloy of iron, chromium and aluminum manufactured by Kanthal AB, Hallstahammar, Sweden. The heating ribbons operate in ambient air, and the temperature of each ribbon is controlled independently. The use of resistive heating elements is desirable for a number of reasons. The temperature of a resistive heating element is continuously variable, and is easily controlled by controlling the amount of current flowing through the element. Thus, any temperature within the heating element's range of operation is obtainable by selecting an appropriate amount of current flow. In addition, a resistive heating element does not require an open flame burning combustible fuels. The ribbons are shaped and are heated to create a suitable heating profile in the vicinity of the splice. In an exemplary heating block 150 according to the present aspect of the invention, the filaments have the following dimensions:

| | Width | Thickness | Current | Power Consumption |
|---|---|---|---|---|
| Filament 1 (element 154) | 2.0 mm | 0.125 mm | 7.5 A | 18 Watts |

-continued

| | Width | Thickness | Current | Power Consumption |
|---|---|---|---|---|
| Filament (element 156) | 4.0 mm | 0.100 mm | 16.0 A | 49 Watts |

Each filament 154, 156 includes a U-shaped portion that fits into the heating block channel 152. As discussed above, the channel 152 has a depth of approximately 3 mm and a width of approximately 1 mm. Thus, the U-shaped portion of each filament also has a depth of approximately 3 mm and a width of approximately 1 mm. The two filaments 154 and 156 combine to form a heat zone that is approximately 6 mm wide. Returning to FIG. 10, the heat zone extends from the left edge of the first filament 154 to the right edge of the second filament 156. The splice point is centered within this heat zone, that is, approximately 3 mm from the left edge of the first filament 154, and 3 mm from the right edge of the second filament 156.

Figure 12:
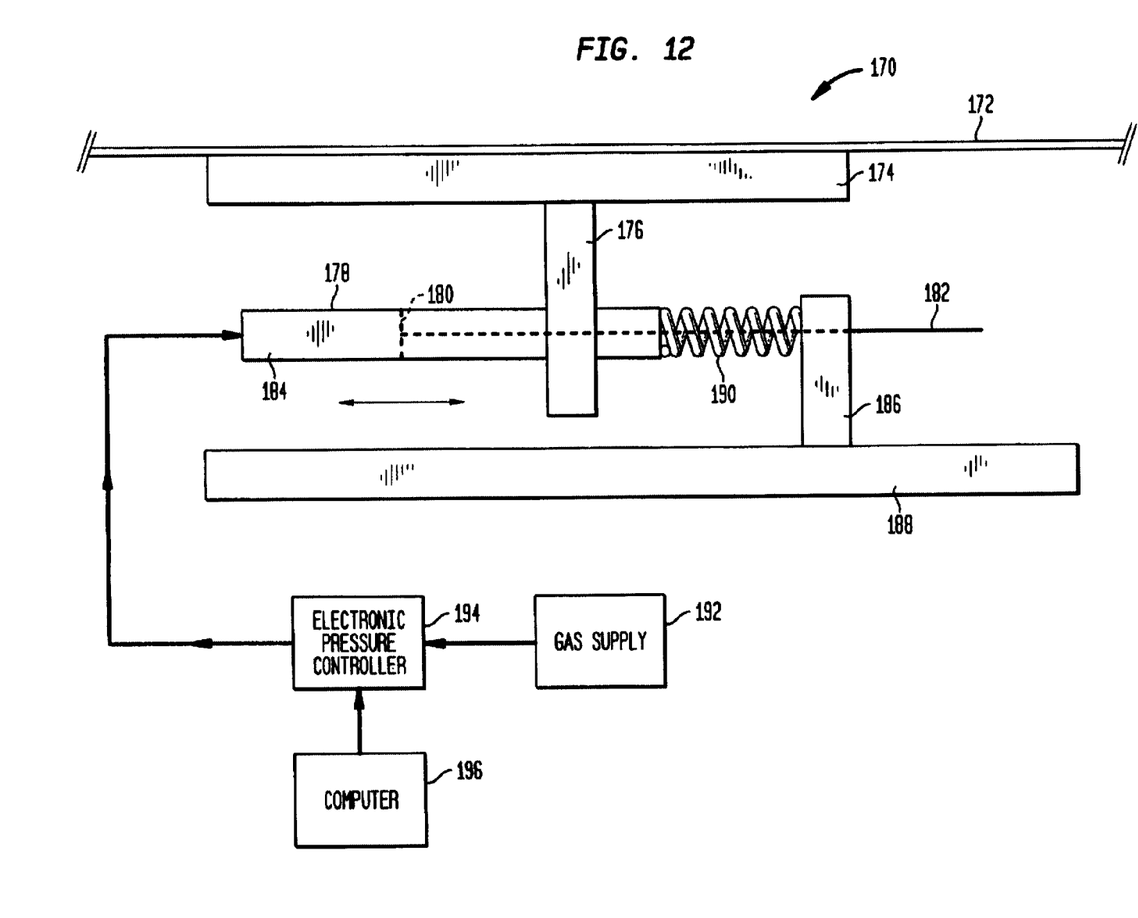
FIG. 12 shows a diagram of tensioning system suitable for use in the apparatus shown in FIG. 9.

FIG. 12 shows a diagram of a tensioning system 170 suitable for use in the H&T apparatus 120 shown in FIG. 9. As shown in FIG. 12, the tensioning system 170 is used to apply tension to a fiber 172 that is removably mounted to a plate 174. The plate includes a bracket 176 that is mounted to a pneumatic piston assembly 178. The piston assembly 178 includes a plunger 180 that is mounted to a post 182. The plunger 180 forms part of an interior chamber 184. Increasing or decreasing the pneumatic pressure inside the chamber 184 tends to cause the outer housing of the piston assembly 178 to move relative to the post 182. The post 182 is mounted to an anchor bracket 186 which, in turn, is mounted to a fixed block 188. The piston assembly 178 is further provided with a bias spring 190. The piston assembly 178 is fed by a gas supply 192, which is regulated by an electronic pressure controller 194. The electronic pressure controller 194 is controlled by a computer 196 or other suitable controller device.

The fiber 172 is mounted onto plate 174 while the piston assembly 178 is in its initial, resting position. When it is time to apply tension to the fiber 172, gas from gas supply 192 is fed to the piston assembly 178, which causes the plate 174 to be urged away from a second mounting plate, not shown. In FIG. 12, the plate 174 is urged towards the left. When it is time to remove the applied tension, the gas supply 192 is cut off. As the pressure inside the piston 178 decreases, the bias spring 190 pulls the plate 174 and fiber 172 back into the initial, resting position. The tensioning system 170 is continuously variable, and can be used to produce a smooth upward tension ramp in an H&T process, as described below.

As illustrated in FIG. 9, first and second power supplies 142 and 144 are used to control the temperature of heating elements 138 and 140 by controlling the current flow through heating filaments 138 and 140. As illustrated in FIG. 12, the tension applied to the splice point is controlled by using an electronic pressure controller 194 to control the internal pressure of piston 178. Thus, a suitable heat and tension profile may be created by controlling filament current and piston pressure.

Figure 13:
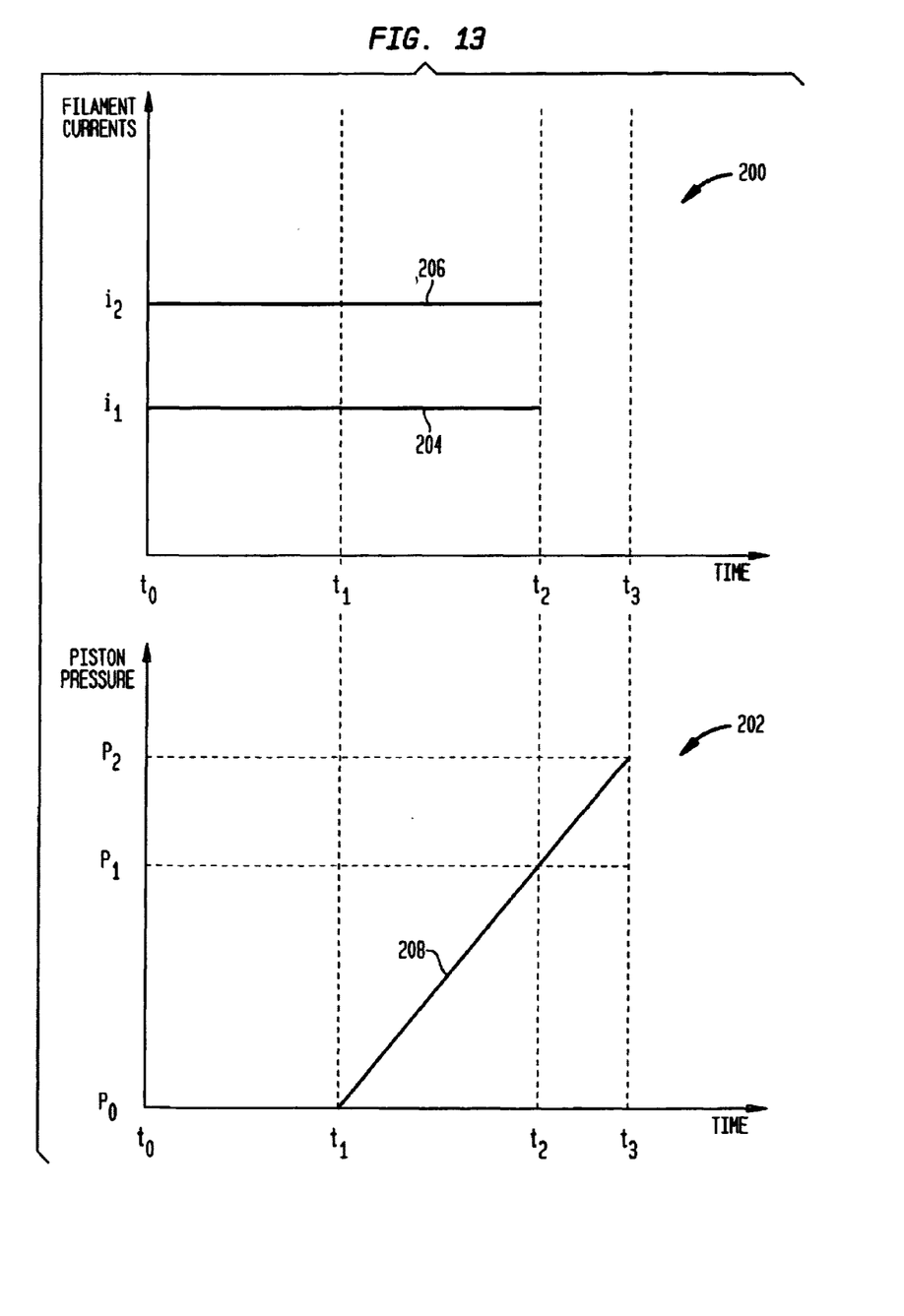
FIG. 13 shows a pair of graphs illustrating filament current and piston pressure profiles according to an aspect of the present invention.

FIG. 13 shows a pair of graphs 200 and 202 illustrating filament current and piston pressure profiles that have been used in practicing the present invention. In the upper graph 200, the x-axis represents time, and the y-axis represents current flow. In the lower graph 200, the x-axis also represents time, and the y-axis represents piston pressure. The spliced and TEC-treated fibers have been loaded into an H&T station, such as the station 120 shown in FIG. 2. The H&T process is commenced at time $t_0$ by inducing current flow in the two filaments 154 and 156 shown in FIG. 10. Trace 204 represents current flow through the first filament 154, and trace 206 represents current flow through the second filament 156. As mentioned above, the first filament 154 has a width that is approximately half that of the second filament 156. As shown by trace 204, current flow through the first filament 154 is maintained at a first current $i_1$. As shown by trace 206, current flow through the second filament 156 is maintained at a second current $i_2$.

As shown in the lower graph 202, at time $t_0$ the piston pressure, which is represented by trace 208, starts at an initial pressure $P_0$. This initial pressure $P_0$ is maintained until time $t_1$, at which point the piston pressure is ramped upward at a constant slope. At time $t_2$, the filament currents are shut off, but the piston pressure continues to ramp up until time $t_3$, at which point the piston pressure is allowed to return to $P_0$. Shutting off the filament currents at time $t_2$ causes the fibers to begin to cool and contract. Because of the relatively low heat capacity of the heating elements 154 and 156, the cooling and contraction of the spliced fibers is relatively rapid. This contraction of the spliced fibers causes an increase in tension as the piston pressure continues to ramp upward between time $t_2$ and time $t_3$. It has been found that this squeezing tends to increase the reduction in splice loss.

Figure 14:
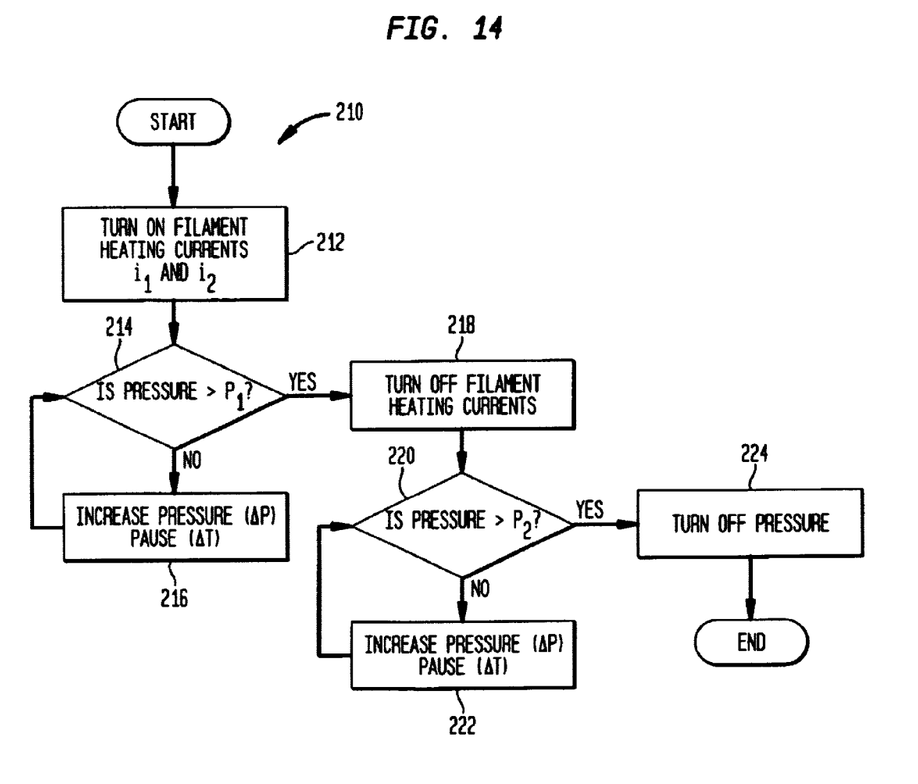
FIG. 14 shows a flowchart illustrating a control process for implementing the filament current and piston profiles shown in FIG. 13.

FIG. 14 shows a flowchart illustrating a control process 210 that may suitably be used to implement the filament current and piston profiles shown in graphs 200 and 202 in FIG. 13. In step 212, the computer or other controller unit turns on the filament heating currents. In step 214, the controller determines whether the piston pressure is greater than $P_1$. If not, then in step 216, the controller incrementally increases the piston pressure and returns to step 214 after a predetermined pause. Steps 214 and 216 are repeated until the piston pressure has ramped up to pressure $P_1$. At that point, in step 218, the heating filament currents are turned off. In step 220, the controller determines whether the piston pressure is greater than $P_2$. If not, then in step 222, the controller increases the piston pressure incrementally and returns to step 220 after a predetermined pause. Steps 220 and 222 are repeated until the piston pressure has ramped up to pressure $P_2$. In step 224, the piston pressure is then turned off. The parameters $P_1$, $P_2$, $i_1$ and $i_2$ are determined in advance using an empirical approach. However, it would also be possible, within the spirit of the invention, to develop other techniques for determining values for $P_1$, $P_2$, $i_1$ and $i_2$.

Figure 15:
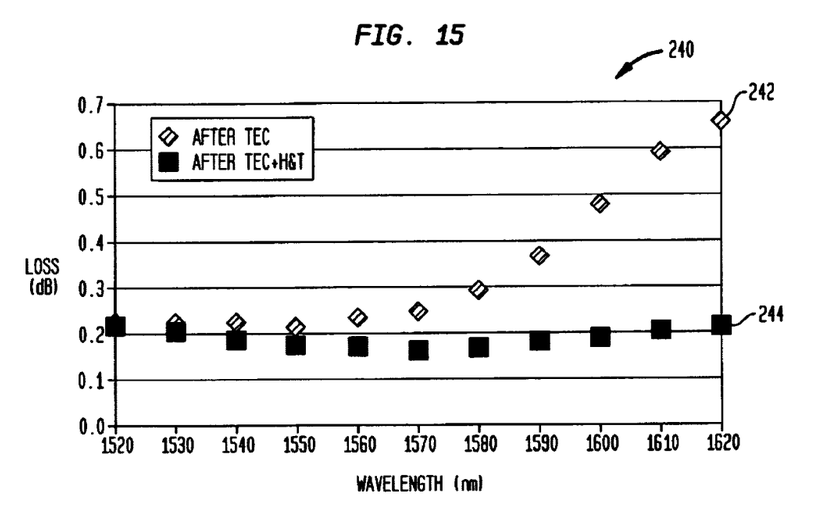
FIG. 15–18 shows a series of graphs illustrating splice loss as a function of wavelength for various pairs of fibers that have been spliced together according to aspects of the present invention.

FIG. 15 shows a graph 240 comparing splice loss as a function of wavelength for an exemplary pair of spliced fibers, including an EHS fiber (−160 ps/nm-km) and a standard SMF. The diamond-shaped points 242 indicate measured splice loss as a function of wavelength for the fibers after a TEC technique has been performed on the spliced fibers. The square-shaped points 244 indicate measured splice loss as a function of wavelength for the fibers after an H&T technique has been subsequently performed on the TEC-treated fibers. As shown in FIG. 15, the combined technique represents a significant improvement over the TEC technique alone, particularly at longer wavelengths.

Figure 16:
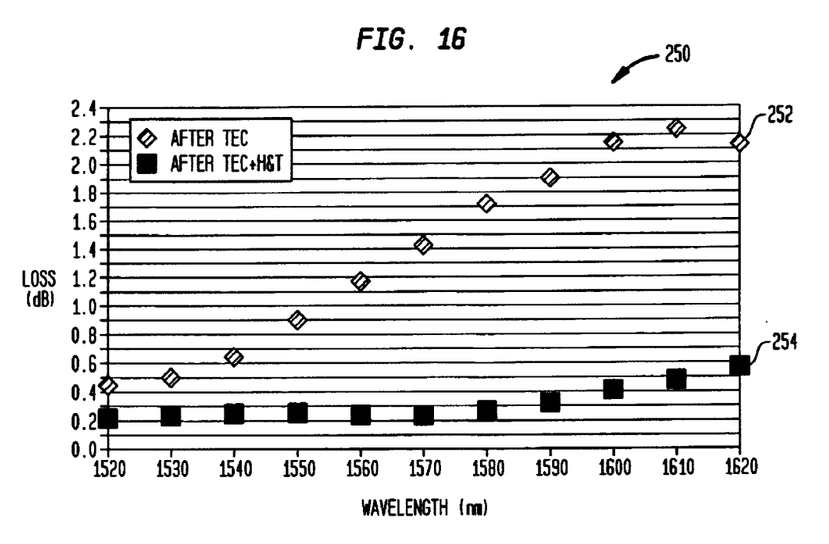

FIG. 16 shows another graph 250 comparing splice loss as a function of wavelength for another exemplary pair of spliced fibers, including an EHS fiber (−210 ps/nm-km) and a standard SMF. Again, the diamond-shaped points 252 show measured loss as a function of wavelength for the fibers after a TEC technique has been performed on the spliced fibers. The square-shaped points 254 show splice loss as a function of wavelength for the fibers after an H&T technique has been subsequently performed on the TEC-treated fibers. As shown in FIG. 16, the combined technique represents a significant improvement over the TEC technique alone, particularly at longer wavelengths.

Figure 17:
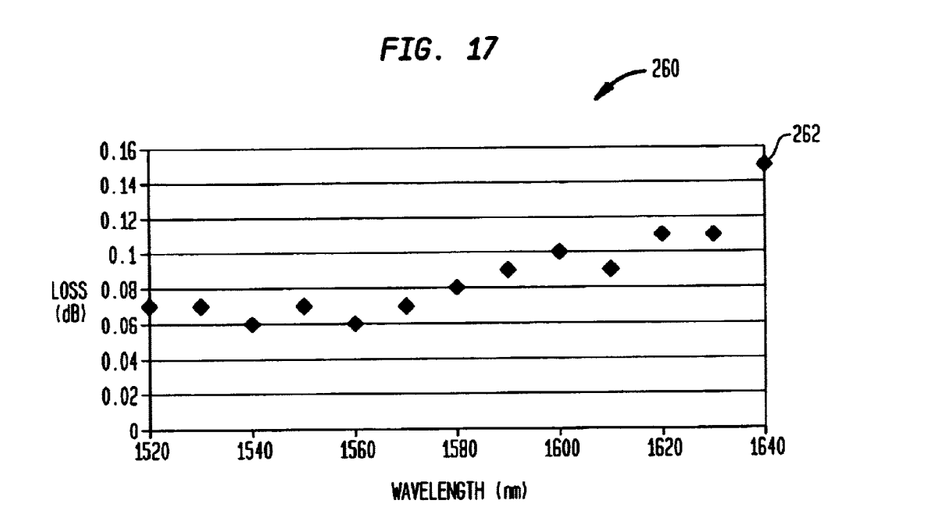

FIG. 17 shows a graph 260 illustrating results obtained by applying a combined TEC and H&T technique on a splice between a wideband DCF (−200 ps/nm-km) and a standard SMF. The diamond-shaped points 262 show splice loss as a function of wavelength. FIG. 17 shows that H&T following TEC yields losses of 0.1 dB or less across the entire conventional band (C-band) and long band (L-band) for splices between SMF and wideband DCF. This reduction in splice loss is significant for such a highly negative dispersion fiber as wideband DCF.

Figure 18:
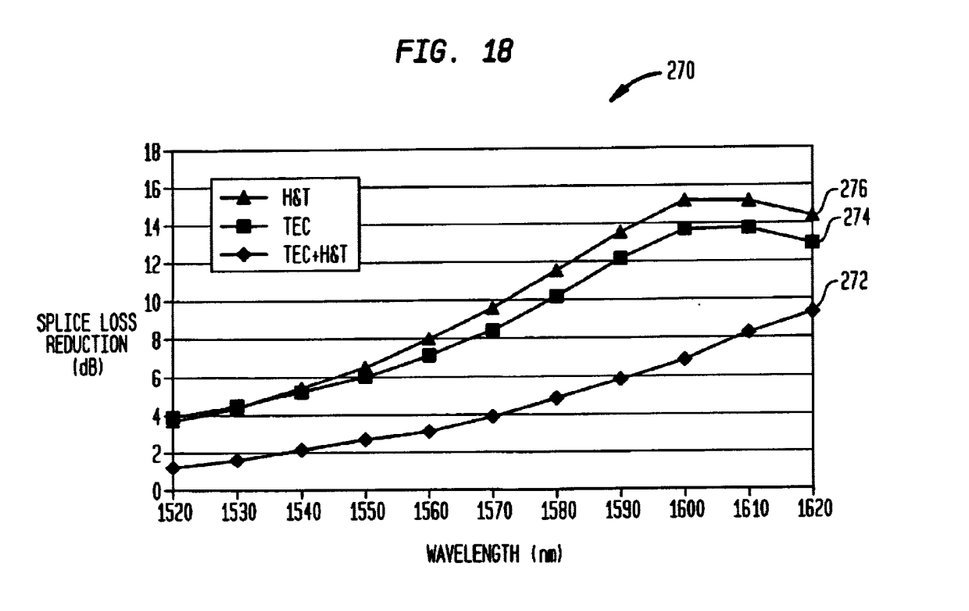

FIG. 18 shows a graph 270 showing splice loss reduction for an EHS (−210 ps/nm-km EHS) spliced to a standard SMF. It is important to note that FIG. 18 shows splice loss reduction, rather than splice loss. Thus, a higher value represents a better result than a lower value. The diamond-shaped points 272 show splice loss reduction as a function of wavelength when only an H&T technique is used. The square-shaped points 274 show splice loss reduction when only a TEC technique is used. Finally, the triangle-shaped points 276 show splice loss reduction when a combined technique is used. As shown in FIG. 18, the combined technique produces a greater splice loss reduction than either an H&T or TEC technique is performed alone.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A fiber treatment station, comprising:
   a first fiber mounting plate for receiving a first optical fiber in a pair of optical fibers spliced together at a splice point;
   a second fiber mounting plate for receiving a second optical fiber in the pair of optical fibers;
   a tensioning system for selectably applying tension to a region of the spliced optical fibers including the splice point; and
   a heating block having at least one heating element, the first fiber mounting plate, the second fiber mounting plate and the heating block being positioned with respect to each other such that the pair of spliced optical fibers extends through the heating block, with the splice point being positioned proximate to the heating element, such that the splice point may be selectably heated by the heating element.

2. The station of claim 1, wherein the heating block includes a channel extending thereacross, and wherein the first and second fiber mounting plates and the heating block are positioned with respect to each other such that the first and second fibers extend through the channel, with the splice point being positioned within the channel.

3. The station of claim 2, wherein the channel is U-shaped.

4. The station of claim 3, further including first and second resistively heated strips that include U-shaped portions affixed to the channel interior proximate to each other, the first and second strips being controlled, respectively, by first and second power supplies.

5. The station of claim 4, wherein the first strip and second strip have different widths.

6. The station of claim 5, wherein the first strip has a width that is approximately one-half the width of the second strip.

7. The station of claim 6, wherein the splice point is centered across the combined widths of the first and second strips.

8. The station of claim 3, wherein the heating element is a resistively heated strip that includes a U-shaped portion affixed to the channel interior.

9. The station of claim 8, wherein the heating element is controlled by a power supply.

10. The station of claim 1, wherein the tensioning system comprises a piston assembly mounted to the first mounting plate, the piston assembly urging the first mounting plate away from the second mounting plate, thereby applying tension to the first and second fibers across the splice point.

11. The station of claim 10, wherein the piston assembly is pneumatically actuated, and wherein the amount of tension applied to the first and second fibers is controlled by controlling gas pressure within the piston assembly.

12. The station of claim 1, further including a controller for controlling the tensioning system and the heating element.

13. A method for reducing splice loss comprising:
   (a) splicing a first fiber to a second fiber at a splice point;
   (b) thermally treating a region of the spliced fibers including the splice point to cause a controlled diffusion of dopants in the region; and
   (c) applying a controlled tension to the splice region while heating the splice region to a predetermined temperature to produce a controlled change in the splice region's strain state.

14. The method of claim 1, wherein step (b) includes loading the spliced fibers into a thermal treatment station.

15. The method of claim 14, wherein step (c) includes removing the spliced fibers from the thermal treatment station and loading the spliced fibers into a heat and tension station.

16. The method of claim 15, wherein step (c) includes positioning the splice point in a heating block in the heat and tension station and supplying a current to a heating element in the heating block to heat the splice point.

17. The method of claim 16, wherein step (c) includes supplying first and second currents to first and second heating elements in the heating block to heat the splice point.

18. The method of claim 17, wherein step (c) includes mounting the first fiber onto a first fiber mounting plate in the heat and tension station and mounting the second fiber onto a second fiber mounting plate in the heat and tension station, and wherein a tension is applied to the splice region by urging the first fiber mounting plate away from the second fiber mounting plate.

19. The method of claim 18, wherein the first fiber mounting plate is urged away from the second fiber mounting plate by controlling gas pressure within a piston assembly to which the first fiber mounting plate is mounted.

20. The method of claim 19, wherein step (c) includes supplying current to the first and second heating elements at a first time $t_0$ and then at a second time $t_1$ after the first time $t_0$ ramping up the gas pressure until it reaches a predetermined pressure $P_1$.

21. The method of claim 20, wherein step (c) includes shutting off the first and second currents when the gas pressure reaches pressure $P_1$ and continuing to ramp up the pressure until it reaches a second predetermined pressure $P_2$.

22. The method of claim 1, further including:
   (d) maintaining the controlled tension, while allowing the splice region to cool.

* * * * *